US009477759B2

(12) United States Patent
Keysar et al.

(10) Patent No.: US 9,477,759 B2
(45) Date of Patent: Oct. 25, 2016

(54) QUESTION ANSWERING USING ENTITY REFERENCES IN UNSTRUCTURED DATA

(71) Applicant: Google Inc., Mountain View, CA (US)

(72) Inventors: Dvir Keysar, Herzliya (IL); Tomer Shmiel, Ramat Gan (IL)

(73) Assignee: Google Inc., Mountain View, CA (US)

( * ) Notice: Subject to any disclaimer, the term of this patent is extended or adjusted under 35 U.S.C. 154(b) by 156 days.

(21) Appl. No.: 13/842,591

(22) Filed: Mar. 15, 2013

(65) Prior Publication Data

US 2014/0280114 A1 Sep. 18, 2014

(51) Int. Cl.
*G06F 17/30* (2006.01)

(52) U.S. Cl.
CPC ... *G06F 17/30864* (2013.01); *G06F 17/30731* (2013.01); *G06F 17/30867* (2013.01)

(58) Field of Classification Search
CPC .............. G06F 17/30867; G06F 17/30864; G06F 17/30424; G06F 17/3053; G06F 17/30873; G06F 17/30722; G06F 17/30321; G06F 17/30442
USPC ......... 707/999.003, E17.108, 748, 769, 723, 707/722, 706, 727, 730
See application file for complete search history.

(56) References Cited

U.S. PATENT DOCUMENTS

| | | | |
|---|---|---|---|
| 5,666,502 A | 9/1997 | Capps | |
| 5,946,647 A | 8/1999 | Miller et al. | |
| 6,185,558 B1 * | 2/2001 | Bowman | G06F 17/30646 705/37 |
| 6,513,036 B2 | 1/2003 | Fruensgaard et al. | |
| 6,832,218 B1 | 12/2004 | Emens et al. | |
| 6,847,959 B1 | 1/2005 | Arrouye et al. | |
| 6,944,612 B2 | 9/2005 | Roustant et al. | |
| 7,028,026 B1 * | 4/2006 | Yang | G06F 17/30864 |
| 7,502,770 B2 | 3/2009 | Hillis et al. | |
| 7,562,076 B2 | 7/2009 | Kapur | |
| 7,565,139 B2 | 7/2009 | Neven, Sr. et al. | |
| 7,603,374 B2 | 10/2009 | Cameron et al. | |
| 7,761,414 B2 | 7/2010 | Freedman | |

(Continued)

FOREIGN PATENT DOCUMENTS

| | | |
|---|---|---|
| CN | 101341464 A | 1/2009 |
| WO | WO 0131479 | 5/2001 |

(Continued)

OTHER PUBLICATIONS

Marie-Catherine De Marneffe, Christopher D. Manning, "Stanford Typed Dependencies Manual," Sep. 2011, 24 pages.

(Continued)

*Primary Examiner* — Robert Beausoliel, Jr.
*Assistant Examiner* — Pedro J Santos
(74) *Attorney, Agent, or Firm* — Middleton Reutlinger

(57) ABSTRACT

Methods, systems, and computer-readable media are provided for collective reconciliation. In some implementations, a query is received, wherein the query is associated at least in part with a type of entity. One or more search results are generated based at least in part on the query. Previously generated data is retrieved associated with at least one search result of the one or more of search results, the data comprising one or more entity references in the at least one search result corresponding to the type of entity. The one or more entity references are ranked, and an entity result is selected from the one or more entity references based at least in part on the ranking. An answer to the query is provided based at least in part on the entity result.

21 Claims, 8 Drawing Sheets

(56) References Cited

U.S. PATENT DOCUMENTS

| | | |
|---|---|---|
| 7,765,206 B2 | 7/2010 | Hillis et al. |
| 7,797,336 B2 | 9/2010 | Blair et al. |
| 7,818,324 B1 | 10/2010 | Held et al. |
| 7,895,196 B2 | 2/2011 | Mahadevan et al. |
| 7,933,900 B2 | 4/2011 | Reddy et al. |
| 8,005,720 B2 | 8/2011 | King et al. |
| 8,051,104 B2 | 11/2011 | Weissman et al. |
| 8,069,175 B2 | 11/2011 | Hillis et al. |
| 8,086,604 B2 | 12/2011 | Arrouye et al. |
| 8,204,856 B2 | 6/2012 | Meyer et al. |
| 8,286,885 B1 | 10/2012 | Zehr et al. |
| 8,316,029 B2 | 11/2012 | Lawrence |
| 8,429,103 B1 | 4/2013 | Aradhye et al. |
| 2002/0083038 A1 | 6/2002 | Berndt |
| 2002/0083039 A1 | 6/2002 | Ferrari et al. |
| 2002/0091688 A1* | 7/2002 | Decary et al. ........ 707/6 |
| 2004/0093321 A1 | 5/2004 | Roustant et al. |
| 2005/0222975 A1* | 10/2005 | Nayak et al. ........ 707/3 |
| 2006/0026147 A1 | 2/2006 | Cone et al. |
| 2007/0073748 A1* | 3/2007 | Barney ........ 707/101 |
| 2007/0124291 A1* | 5/2007 | Hassan et al. ........ 707/3 |
| 2007/0260594 A1 | 11/2007 | Lewak et al. |
| 2008/0010273 A1 | 1/2008 | Frank |
| 2008/0126143 A1 | 5/2008 | Altman et al. |
| 2009/0224867 A1 | 9/2009 | O'Shaughnessy et al. |
| 2010/0070448 A1 | 3/2010 | Omoigui |
| 2011/0004608 A1* | 1/2011 | Solaro et al. ........ 707/759 |
| 2011/0137883 A1 | 6/2011 | Lagad et al. |
| 2011/0184981 A1 | 7/2011 | Lu et al. |
| 2011/0202493 A1 | 8/2011 | Li |
| 2012/0016678 A1* | 1/2012 | Gruber et al. ........ 704/275 |
| 2012/0021783 A1* | 1/2012 | Wilson ........ 455/466 |
| 2012/0101858 A1 | 4/2012 | Depasquale et al. |
| 2012/0101901 A1 | 4/2012 | Depasquale et al. |
| 2012/0150572 A1 | 6/2012 | Fredericks et al. |
| 2012/0246153 A1 | 9/2012 | Pehle |
| 2012/0317103 A1* | 12/2012 | Qiao ........ 707/723 |
| 2012/0330906 A1 | 12/2012 | Fredericks et al. |
| 2013/0054542 A1 | 2/2013 | Ollenberger et al. |
| 2013/0110833 A1 | 5/2013 | Fredericks et al. |

FOREIGN PATENT DOCUMENTS

| | | |
|---|---|---|
| WO | WO 2006110480 | 10/2006 |
| WO | WO 2010120925 | 10/2010 |

OTHER PUBLICATIONS

Kao, Wayne, "Telling the Story of Friendships," Facebook, Oct. 28, 2010, available at http://blog.facebook.com/blog.php-?post=443390892130, pp. 1-2.

Dekang Lin, "Dependency-based Evaluation of Minipar," In Workshop on the Evaluation of Parsing Systems, May 1, 1998, 14 pages, Granada, Spain.

Rion Snow, Daniel Jurafsky, Andrew Y. Ng, "Learning Syntactic Patterns for Automatic Hypernym Discovery," 2011, 8 pages.

Veselin Stoyanov, Claire Cardie, Nathan Gilbert, Ellen Riloff, David Buttler, David Hysom, "Reconcile: A Coreference Resolution Research Platform," May 13, 2010, 14 pages.

Tripit, "Announcing TripIt—The First Intelligent Travel Organizer for Do-It-Yourself Trip Planners," Concur Technologies Inc., Sep. 18, 2007, available at http://www.tripit.com/press/company-announcements/announcing-tripit-first-intelligent-travel-organizer-do-it-yourself-trip, pp. 1-2.

Patanaik, Amaiya, "Open Domain Factoid Question Answering System," Thesis, Indian Institute of Technology—Kharagpur, Department of Electrical Engineering, May 2009, 48 pages.

International Search Report, issued for PCT/US2014/024097, mailed Jul. 3, 2014 (3 pages).

Written Opinion of the International Searching Authority, issued for PCT/US2014/024097, mailed Jul. 3, 2014 (7 pages).

* cited by examiner

QUESTION ANSWERING USING ENTITY REFERENCES IN UNSTRUCTURED DATA

BACKGROUND

This specification generally relates to answering questions using a search system. Answers to questions have been determined based on previously user-answered questions and manually generated databases.

SUMMARY

In some implementations, a system provides answers to natural language search queries by relying on entity references identified based in the unstructured data associated with search results. In some implementations, a system receives a natural language query such as a "who" question. For example, "Who is the President?" or "Who was the first person to climb Mt. Everest?" In some implementations, the system retrieves a number of search results, for example, a list of references to webpages on the Internet. In some implementations, the system retrieves additional, preprocessed information associated each respective webpage of at least some of the search results. In some implementations, the additional information includes, for example, names of people that appear in the webpages. In an example, in order to answer a "who" question, the system compiles names appearing in the first ten search results, as identified in the additional information. The system identifies the most commonly appearing name as the answer, and returns that answer to the user. It will be understood that in some implementations, the system answers questions other than "who" questions using the above-described technique, such as "what" or "where" questions.

In some implementations, a computer-implemented method includes receiving a query, wherein the query is associated at least in part with a type of entity. The method includes generating one or more search results based at least in part on the query. The method includes retrieving previously generated data associated with at least one search result of the one or more of search results, the data comprising one or more entity references in the at least one search result corresponding to the type of entity. The method includes ranking the one or more entity references. The method includes selecting an entity result from the one or more entity references based at least in part on the ranking. The method includes providing an answer to the query based at least in part on the entity result. Other implementations of this aspect include corresponding systems and computer programs, configured to perform the actions of the methods, encoded on computer storage devices.

These and other implementations can each include one or more of the following features. In some implementations, the query is a natural language query. In some implementations, the type of the entity is a person type. In some implementations, ranking the one or more entity references comprises ranking based on at least one ranking signal. In some implementations, the one or more ranking signals comprise a frequency of occurrence of each respective entity reference. In some implementations, the one or more ranking signals comprise a topicality score of each respective entity reference. In some implementations, the previously generated data corresponds to unstructured data.

One or more of the implementations of the subject matter described herein may provide one or more of the following advantages. In some implementations, questions may be provided for queries in an automated and continuously updated fashion. In some implementations, question answering may take advantage of search result ranking techniques. In some implementations, question answers may be identified automatically based on unstructured content of a network such as the Internet.

DETAILED DESCRIPTION OF THE FIGURES

In some implementations, answers to questions are provided by a question answering system. In some implementations, the system receives a query, retrieves search results, retrieves content associated with the search results, and determines an answer to the question based on the retrieved content.

In some implementations, the associated content includes entity references. As used herein, an entity is a thing or concept that is singular, unique, well-defined and distinguishable. For example, an entity may be a person, place, item, idea, abstract concept, concrete element, other suitable thing, or any combination thereof. Generally, entities include things or concepts represented linguistically by nouns. For example, the color "Blue," the city "San Francisco," and the imaginary animal "Unicorn" may each be entities. An entity generally refers to the concept of the entity. In some implementations, an entity reference is a reference, for example a text string, which refers to the entity. For example, the entity reference "New York City" is a reference to the physical city.

In some implementations, an entity is associated with a type of entity. As used herein, a type is a categorization or defining characteristic associated with one or more entities. For example, types may include persons, locations, movies, musicians, animals, and so on. For example, "who" questions may have answers of the person type. It will be understood that while the system described below is generally shown in reference to natural language "who" questions, any suitable type of question may be answered.

In some implementations, the system described below receives natural language search queries. As used herein, natural language refers to words, syntax, and other language such as it could be used in conversation or prose. For example, natural language may include complete sentences, questions, idiom, punctuation, any other suitable language elements or structures, or any combination thereof. For example, the query [Who was the first person to fly an airplane?] is a natural language query. It will be understood that queries, including natural language queries, may be in any suitable language such as English, French, Chinese, and so on. It will be understood that in some implementations, the system need not receive a natural language query and may receive a query in any suitable form.

Figure 1:
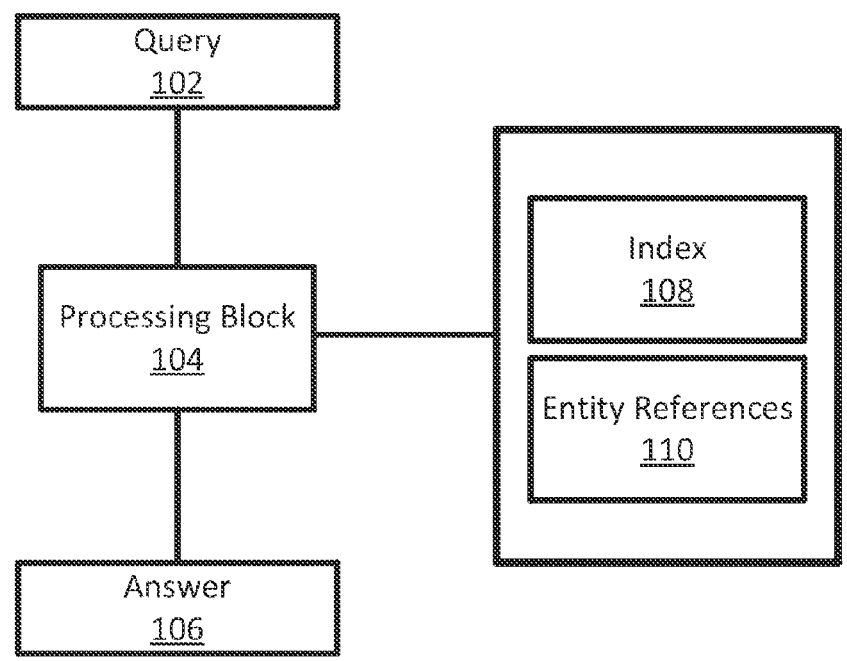
FIG. 1 is a high level block diagram of a system for question answering in accordance with some implementations of the present disclosure.

FIG. 1 is a high level block diagram of a system for question answering in accordance with some implementations of the present disclosure. System 100 includes query 102, processing block 104, answer 106, index 108 and entity references 110. System 100 may be any suitable hardware, software, or both for implementing the features described in the present disclosure and will generally be referred to, herein, as "the system." In some implementations, query 102 represents a query received by a system. In some implementations, query 102 is a natural language search query. In some implementations, query 102 is received from user input, from another application, is generated by the system based on previously received input or data, is determined in any other suitable way, or any combination thereof. In an example, the system receives a natural language query in search box on a search webpage from a user. In another example, the system receives voice input from a user.

In some implementations, processing block 104 receives a query from query 102. In some implementations, processing block 104 generates one or more search results based on the query. In some implementations, search results are determined by processing block 104 based on index 108. In some implementations, index 108 is an index of webpages and other content. For example, index 108 includes indexed webpages on the internet. Processing block 104 retrieves information from entity references 110, including one or more entity references associated with search results. For example, the system may retrieve entity references associated with the top ten search results. Processing block 104 ranks the one or more retrieved entity references, selects an entity result based on the ranking, and provides an answer based on the entity result to answer 106. In some implementations, the ranking and/or selecting is based on a quality score, a freshness score, a relevance score, on any other suitable information, or any combination thereof.

In an example, the information retrieved from entity references 110 associated with a particular webpage is a list of persons appearing in that webpage. For example, a particular webpage may include a number of names of persons, and entity references 110 may include a list of the names included within the webpage. Entity references 110 may also include other information. In some implementations, entity references 110 includes entity references of different types, for example, people, places, and dates. In some implementations, entity references for multiple entity types are maintained as a single annotated list of entity references, as separated lists, in any other suitable format of information, or any combination thereof. It will be understood that in some implementations, entity references 110 and index 108 may be stored in a single index, in multiple indices, in any other suitable structure, or any combination thereof.

In some implementations, the system identifies a type of query, for example a "who" query, and retrieves entity references from entity references 110 associated with search results for the query and also associated with the type of query. In some implementations, the system retrieves entity references associated with a particular number of search results, for example, the top ten ordered search results. In some implementations, the system aggregates the identified entity references associated with each of the webpages into a single list of references, ranks the identified entities references, and selects the highest ranked entity reference as the answer to the query. In some implementations, the system provides the identified most commonly occurring entity reference as answer 106. In some implementations, one or more ranking metrics are used to rank the entity references, including frequency of occurrence and a topicality score. Frequency of occurrence relates to the number of times an entity reference occurs within a particular document, collection of documents, or other content. Topicality scores include a relationship between the entity reference and the content in which it appears. Answer 106 is an answer to query 102. It will be understood, and explained in further detail below, that the aforementioned technique is merely exemplary and that the system may use any other suitable techniques in processing the query, identifying entity references, aggregating entity references from multiple search results, providing the answer, and other suitable steps performed by the system.

Figure 2:
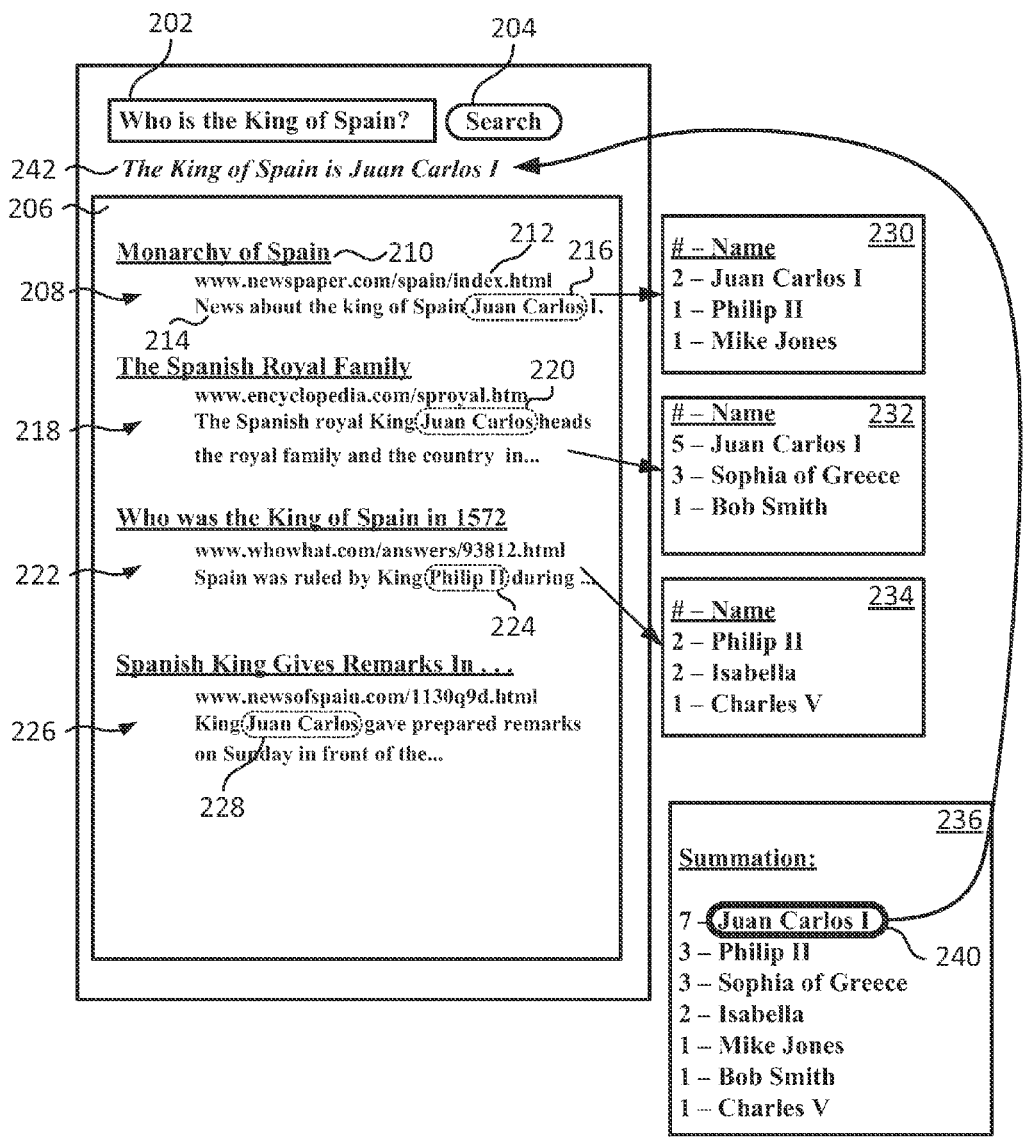
FIG. 2 shows an illustrative example of answering a question in accordance with some implementations of the present disclosure.

FIG. 2 shows an illustrative example of answering a question in accordance with some implementations of the present disclosure. In the illustrated example, a webpage search engine receives a "who" question, retrieves a number of search results, and provides an answer based on the search results and information associated with the search results. It will be understood that while the illustrated example refers to person entities in response to a "who" question, any suitable type of entity may be identified in response to any suitable type of question. For example, location entities may be identified in response to a "where" question.

Search example 200 includes search query box 202 and search button 204. In the illustrated example, query box 202 includes the natural language search query [Who is the King of Spain?]. In some implementations, the content of query box 202 may be received using a keyboard, a virtual keypad, voice input, any other suitable input, or any combination thereof. It will be understood that the system may receive any suitable query in query box 202. In some implementations, search query box 202 receives query 102 of FIG. 1. For example, the query may not be a natural language query, may omit the question mark, may include additional search terms, may include any other suitable search query elements, or any combination thereof. In some implementations, the query includes text, images, video, audio, voice input, data from other applications, social media data, any other suitable content, or any combination thereof. In some implementations, search button 204 receives input indicating a user's desire to perform a search on the query in query box 202. In some implementations, input to search button 204 includes a mouse click, a touchscreen selection, a keystroke, voice input, any other suitable input, or any combination thereof. In some implementations, search button 204 is omitted.

In some implementations, the system retrieves one or more search results based on the search query in query box 202. In some implementations, the system displays search results in search results box 206. As illustrated, search results include search result 208, search result 218, search result 222, and search result 226. Search result 208 includes title 210 [Monarchy of Spain], URL 212, and snippet 214. Title 210 includes a manually or automatically generated title associated with the search result. URL 212 includes a universal resource locator, sometimes referred to as a web address, that is associated with the search result. Snippet 214 includes a short section or selection of content from the search result. It will be understood that in some implementations, a search result such as search result 208 includes any suitable content including title 210, URL 212, snippet 214, other suitable text, images, video, audio, an abstract of the search result, a summary of the search result, automatically generated content, manually generated content, social network data, user reviews, a search result relevancy score, any other suitable content associated with the search result, or any combination thereof. It will be understood that search results 218, 222, and 226 may include any suitable content or combination of content as described for search result 208. It will also be understood that search result box 206 may include any suitable number of search results. It will also be understood that the particular arrangement and display of search results in search result box 206 is merely exemplary and that any suitable display of search results may be used. In an example, multiple pages of search results are provided.

In some implementations, the system orders the search results in search results box 206. In some implementations, the system orders the search results based on one or more quality scores. In some implementations, quality scores include a relevance to search query, a quality score associated with the search result, a freshness score associated with the time when the data the content was last generated or updated, scores associated with previous selection of a particular search result from a collection of search results, any other suitable quality score, or any combination thereof. In an example, a quality score associated with a search result may include the number of links to and from a corresponding webpage.

In some implementations, the system selects a particular number of the top orders search results for use in answering a question. In the illustrated example, the system uses the top three results in search results box 206. It will be understood that any suitable number may be selected using any suitable technique.

In some implementations, the system identifies person entity references in the content of search results. In some implementations, this processing is performed offline, such that when a search is performed, a list of entity references associated with a webpage is also retrieved. In some implementations, the identification of entity references is performed at the time of the search.

In some implementations, the system generates a collection of entity references appearing in a webpage by comparing the structured or unstructured text to a list of known entity references, for example a list of names. In some implementations, entity references not previously known are identified based on a frequency of occurrence or other clustering techniques. In some implementations, entity references are person entity references, for example, names of people appearing in the text of a webpage. In an example, the system maintains a list of all of the names of people that appear in a particular webpage, and that list is retrieved when the webpage appears in the top results of search results box 206.

In the illustrated example the system identifies person entity references associated with the search results. Entity reference 216 [Juan Carlos] appears in snippet 214. It will be understood that while in the illustrated example, entity references are shown in the snippets, entity references may appear in any suitable content of the webpage. In some implementations, entity references appear in the unstructured text of a webpage.

In the illustrated example, a list of person entity references associated with search result 208 is shown in list 230. In an example, entity reference 216 [Juan Carlos] appears once in the snippet, as shown, and once elsewhere in the search result, and thus list 230 includes a frequency value "2" associated with [Juan Carlos]. List 230 also includes the entry [Philip II] with a frequency of 1, and [Mike Jones] with a frequency of 1. In an example, [Philip II] corresponds to a $16^{th}$ century king of Spain, and [Mike Jones] corresponds to the author of a book on Spanish Kings. List 232 includes person entity references associated with search result 218, including 5 occurrences of entity reference 220 [Juan Carlos], 3 occurrences of [Sophia of Greece] and 1 occurrence of [Bob Smith]. List 234 includes person entity references associated with search result 222, including 2 occurrences of entity reference 224 [Philip II], 2 occurrences of [Isabella], and 1 occurrence of [Charles V].

In some implementations, the system calculates the sum the entity references occurring in list 230, list 232, and list 234, as shown in summation 236. In the illustrated example, there are 7 instances of [Juan Carlos I] identified in the top three search results shown in search result box 206. In some implementations, the system identifies [Juan Carlos I] as entity result 240 and provides answer 242 based on entity result 240. In some implementations, the system displays answer 242 including the text [The King of Spain is Juan Carlos I]. In some implementations, the system displays only text [Juan Carlos I]. In some implementations, the system generates a natural language or other format response based in part on the received query. In some implementations, the system may display additional information associated with the answer, for example, a picture of Juan Carlos I or a link to an encyclopedia entry. It will be understood that in some implementations, the system may display content in search results box 206 before displaying answer 240.

Figure 3:
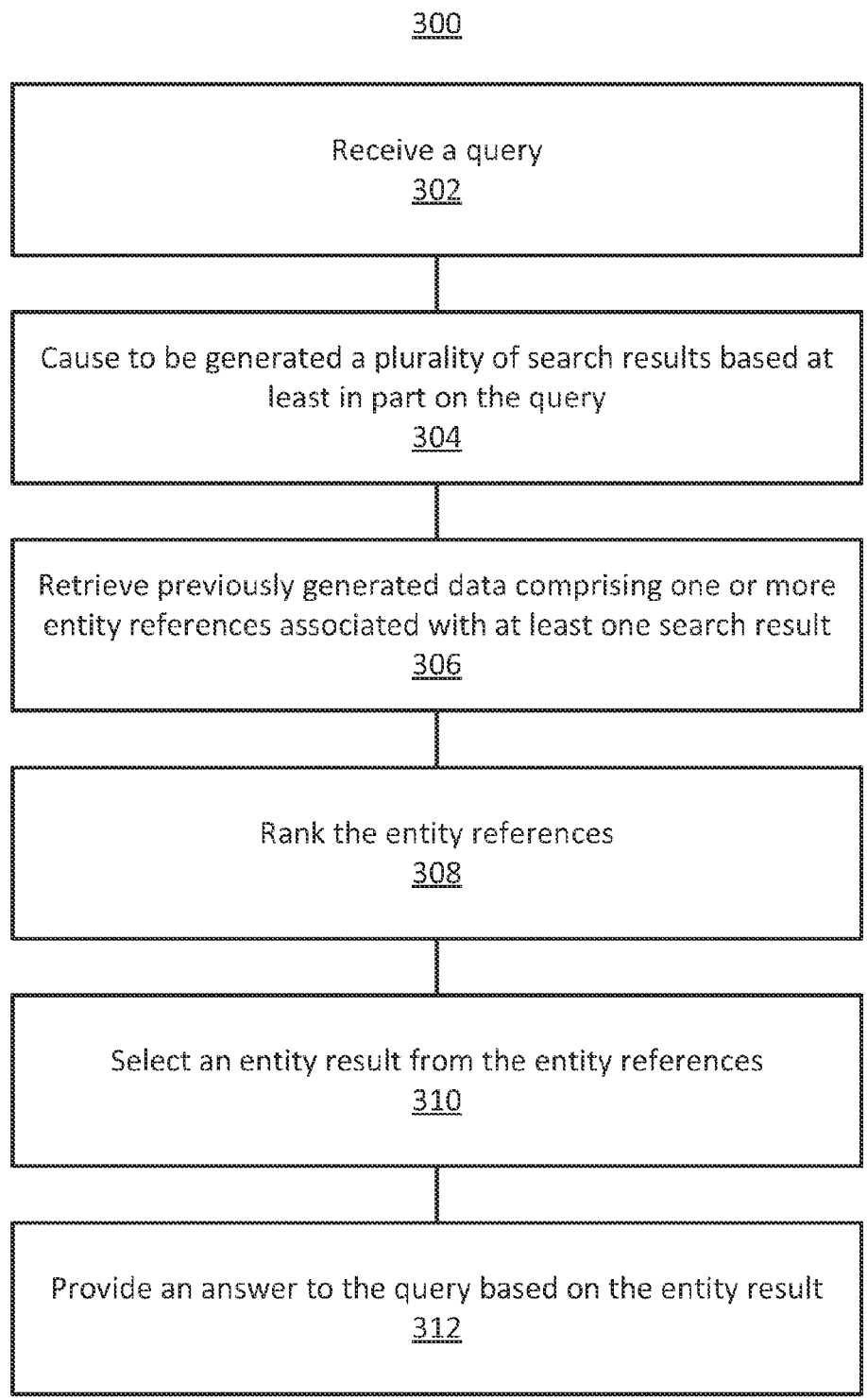
FIG. 3 shows a flow diagram including illustrative steps for answering questions in accordance with some implementations of the present disclosure.

FIG. 3 shows flow diagram 300 including illustrative steps for answering questions in accordance with some implementations of the present disclosure.

In step 302, the system receives a query. In an example, the query is received in query box 202 of FIG. 2 or query 102 of FIG. 2. In some implementations, the query is a "who" query, that is to say, it includes a question where the answer is a person. In some implementations, a person is defined as an individual, a group of people, a company, a legal entity, a team, any other suitable identification, or any combination thereof. In an example, a "who" queries include [Who was the first to climb Mount Everest?] and [Who won the 1997 World Series]. In some implementations, "who" queries may be implicit, in that they do not necessarily include a question mark and/or an interrogative. In an example, the query [first to climb Mount Everest] is interpreted as a "who" query. It will also be understood that in some implementations, the system may use the technique described herein to answer "what," "where," and other questions.

In step 304, the system generates one or more search results based at least in part on the query. In an example, search results include content displayed in search results box 206 of FIG. 2. In some implementations, search results are identified by processing block 104 of FIG. 1 based in part on index 108 of FIG. 1. In some implementations, search results include a collection of content identified by a search engine as being related to the query. In an example, search results include webpages, images, videos, audio, documents, any other suitable results, or any combination thereof.

In some implementations, search results are ordered based on a number of metrics. For example, metrics may include the metrics described above in relation to search box 206. In an example, the number of links to and/or from a webpage including in a search result impacts its ordering. In another example, the strength of a relationship between a search query and a search result impacts its ordering. In another example, the freshness or date the information was posted or updated impacts ordering. It will be understood that any suitable ordering metric or combination of metrics may be used.

In step 306, the system retrieves previously generated data comprising one or more entity references associated with at least one search result. In an example, list 230 of FIG. 2 is data comprising entity references associated with search result 208 of FIG. 2. In some implementations, the system retrieves previously generated data from entity references 110 of FIG. 1. In some implementations, previously generated data includes a list such as list 230 of FIG. 2. In some implementations, the system processes webpages and other content to identify entity references. In some implementations, the system performs this processing offline, such that it is retrieved at the time of search. In some implementations, the system processes the information in real-time at the time of search.

In some implementations, the previously generated data includes one or more lists of entity references that occur in content associated with a search result. In some implementations, list entries include an entity reference, a unique identifier associated with the entity reference, a frequency of occurrence of the entity reference, the location on the page where the entity reference occurs, metadata associated with the content such as freshness and ordering, any other suitable data, or any combination thereof. In some implementations, previously generated data may include the type of entity reference, for example, a person, a location, a date, any other suitable type, or any combination thereof. In some implementations, previously generated data includes information identifying entities as a particular type, such as a person entity reference, a place entity reference, or a time entity reference. In some implementations, multiple sets of data may be generated for a website or other content, where each set is associated with one or more types. In an example, a website may be associated with a list of the person entity references occurring therein and a list of the location entity references occurring therein.

In some implementations, entity references are identified in unstructured content by comparing words and phrases in the content with known entity references. For example, the system may compare words in the content with a database of names. In some implementations, additional contextual information is used in disambiguation of entity references identification. For example, other names or entity references occurring in the content may be used to disambiguate a reference. In an example, the name [George Washington] occurring in the same text as [Martha Washington] may be identified as relating to a unique entity reference in a list of the U.S. President, whereas [George Washington] occurring in the same content as [University] and [Washington D.C.] is identified as relating to [George Washington University].

In some implementations, the system uses clustering techniques to identify entity references in unstructured content. Clustering is a statistical technique that groups similar objects into groups. Clustering can identify natural groupings in data elements. The groups of objects, such as groups of text strings, may be used to identify frequently occurring words and/or phrases in structured and/or unstructured content. For example, a person's first and last name that appear together repeatedly in unstructured text may be identified as an entity reference.

In step 308, the system ranks the entity references. In an example, ranking the entity references includes the compiling of references shown in summation 236 of FIG. 2. In some implementations, ranking the entity references includes ranking based on one or more ranking signals. In some implementations, the system uses a weighted combination of ranking signals to determine a ranking. In an example, weighting includes the ranking of the search results or other search quality metrics.

In some implementations, the system uses the frequency of occurrence of a particular entity reference as a ranking signal. In some implementations, for example, frequency of occurrence corresponds to the total number of times an entity reference appears in a document. In another example, the system determines a frequency by normalizing a number of appearances by the length of the document or any other suitable metric.

In some implementations, the system uses a topicality score as a ranking signal. In some implementations, topicality scores include freshness, the age of the document, the number of links to and/or from the document, the number of selections of that document in previous search results, a strength of the relationship between the document and the query, any other suitable score, or any combination thereof. In some implementations, a topicality score depends on a relationship between the entity reference and the content within which the entity reference appears. For example, the entity reference [George Washington] may have a higher topicality score on a history webpage than on a current news webpage. In another example, the entity reference [Barak Obama] may have a higher topicality score on a politics website than on a law school website.

In some implementations, the system identifies entity references occurring in a particular number of search results, for example, the top ten ordered search results. In some implementations, the number of search results is determined based on system design, user preferences, the type of query, system availability, system speed, network speed, previous question answering, the quality of an identified answer, any other suitable criteria, or any combination thereof. In some implementation the system may rely on the quality of an identified entity result by adding search results to the processing until the system establishes a degree of confidence in the answer. For example, processing only the top two search results may yield a tie or near-tie for several search results, and the system may successively add previously generated data from lower ordered search results until a particular answer is significantly more common in the results than the others. In some implementations, the system retrieves data from the top ordered search results, where the results are ordered as described above. In some implementations, the particular search results for which previously processed data is retrieved is based on the search result ordering, quality values associated with the particular result, previously processed information, user input, any other suitable data, or any combination thereof.

In step 310, the system selects an entity result from the entity references. In some implementations, selecting a result includes selecting the most commonly occurring entity reference from the references ranked in step 308. In an example, all of the entity references occurring in the top ten search results are compiled and ranked based on frequency of occurrence. In some implementations, the system selects the most frequently occurring result as the entity result. In the example shown in FIG. 2, this selection is illustrated as the box around [Juan Carlos I] in summation 236 of FIG. 2.

In step 312, the system provides an answer to the query based on the entity result. In some implementations, the answer is the entity result selected in step 310. Displaying answer 240 of FIG. 2 is an example of displaying an example. Answer 106 of FIG. 1 is a further example of providing the answer. In some implementations, displaying an answer includes displaying text, images, videos, audio, hyperlinks, any other suitable content, or any combination thereof. In some implementations, the system generates a natural language answer based on the entity result of step 310. In some implementations, a natural language answer is based in part on the query received in step 302. In some implementations, the system displays the answer along with, or in place of, the search results.

Figure 4:
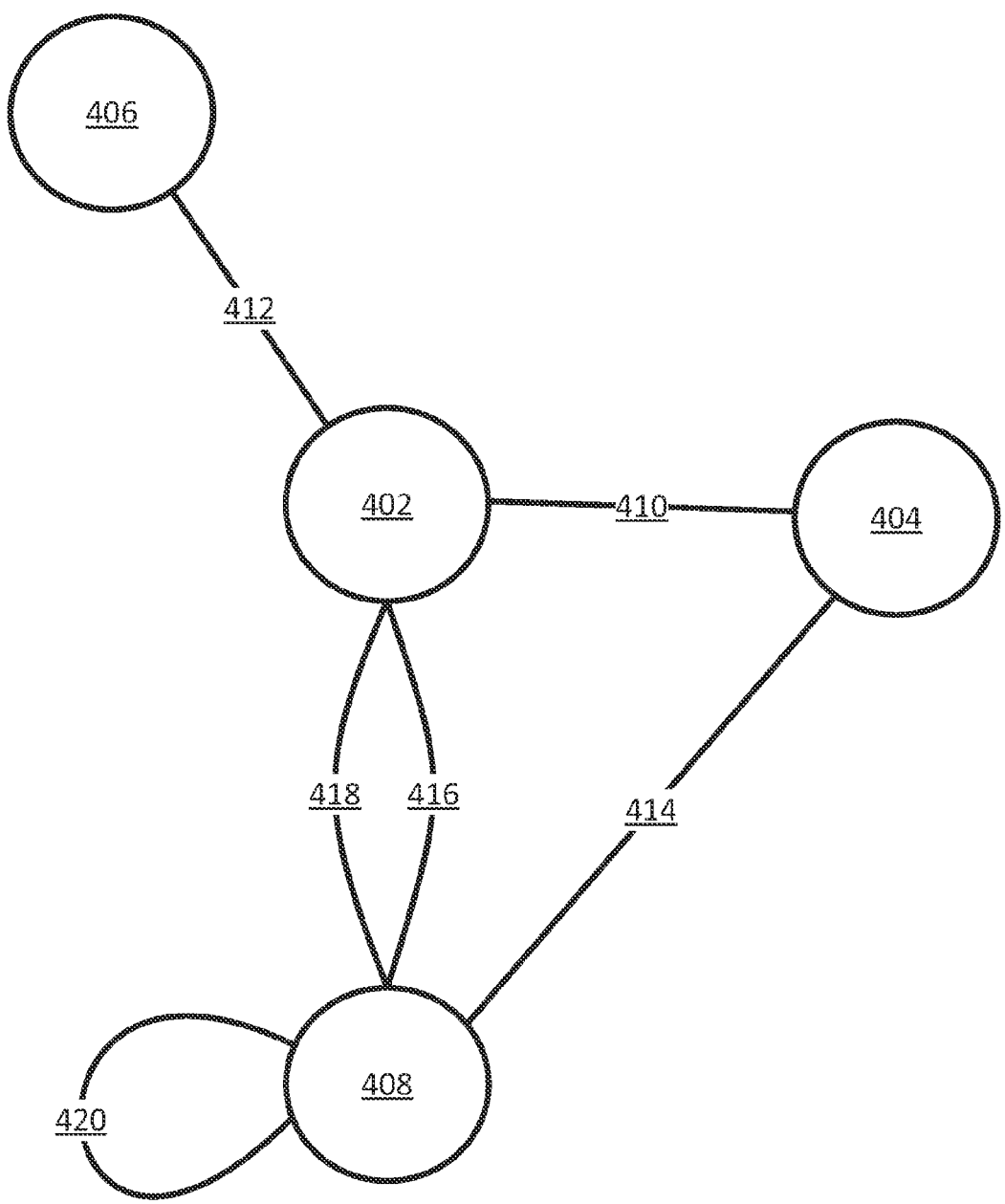
FIG. 4 shows an illustrative data graph containing nodes and edges in accordance with some implementations of the present disclosure.

FIG. 4 shows an illustrative data graph containing nodes and edges in accordance with some implementations of the present disclosure. In some implementations, data in entity references 110 of FIG. 1 is stored as a data graph. In some implementations, illustrative data graph 400 is a portion of a knowledge graph. The knowledge graph is a particular implementation of a data graph and will be described in further detail in relation to FIGS. 5 and 6 below. It will be understood that the data graph implementation of FIG. 4, and the knowledge graph, are merely examples of a data structure that may be used by the system to store entity references and other data, and that any suitable data format may be used. For example, data in entity references 110 of FIG. 1 may be stored as a list of entities and associated entity types. Data stored by the data structure may include any suitable data such as references to data, text, images, characters, computer files, databases, any other suitable data, or any combination thereof. It will be understood that in some implementations, the node and edge description is merely illustrative and that the construction of the data structure may include any suitable technique for describing information and relationships. In an example, nodes may be assigned a unique identification number, and an edge may be described using the identification numbers that a particular edge connects. It will be understood that the representation of data as a graph is merely exemplary and that data may be stored, for example, as a computer file including pieces of data and links and/or references to other pieces of data.

In some implementations, data may be organized in a database using any one or more data structuring techniques. For example, data may be organized in a graph containing nodes connected by edges. In some implementations, the data may include statements about relationships between things and concepts, and those statements may be represented as nodes and edges of a graph. The nodes each contain a piece or pieces of data and the edges represent relationships between the data contained in the nodes that the edges connect. In some implementations, the graph includes one or more pairs of nodes connected by an edge. The edge, and thus the graph, may be directed, i.e. unidirectional, undirected, i.e. bidirectional, or both, i.e. one or more edges may be undirected and one or more edges may be directional in the same graph. Nodes may include any suitable data or data representation. Edges may describe any suitable relationships between the data. In some implementations, an edge is labeled or annotated, such that it includes both the connection between the nodes, and descriptive information about that connection. A particular node may be connected by distinct edges to one or more other nodes, or to itself, such that an extended graph is formed. For purposes of clarity, a graph based on the structure described immediately above is referred to herein as a knowledge graph. In some implementations, the knowledge graph may be a useful for representing information and in providing information in search.

FIG. 4 shows illustrative knowledge graph 400 containing nodes and edges. Illustrative knowledge graph 400 includes nodes 402, 404, 406, and 408. Knowledge graph 400 includes edge 410 connecting node 402 and node 404. Knowledge graph 400 includes edge 412 connecting node 402 and node 406. Knowledge graph 400 includes edge 414 connecting node 404 and node 408. Knowledge graph 400 includes edge 416 and edge 418 connecting node 402 and node 408. Knowledge graph 400 includes edge 420 connecting node 408 to itself. Each aforementioned group of an edge and one or two distinct nodes may be referred to as a triple or 3-tuple. As illustrated, node 402 is directly connected by edges to three other nodes, while nodes 404 and 408 are directly connected by edges to two other nodes. Node 406 is connected by an edge to only one other node, and in some implementations, node 406 is referred to as a terminal node. As illustrated, nodes 402 and 408 are connected by two edges, indicating that the relationship between the nodes is defined by more than one property. As illustrated, node 408 is connected by edge 420 to itself, indicating that a node may relate to itself. While illustrative knowledge graph 400 contains edges that are not labeled as directional, it will be understood that each edge may be unidirectional or bidirectional. It will be understood that this example of a graph is merely an example and that any suitable size or arrangement of nodes and edges may be employed.

Generally, nodes in a knowledge graph can be grouped into several categories. Nodes may represent entities, organizational data such as entity types and properties, literal values, and models of relationships between other nodes. A node of a knowledge graph may represent an entity, as defined above.

In some implementations, entity types, properties, and other suitable content is created, defined, redefined, altered, or otherwise generated by any suitable technique. For example, content may be generated by manual user input, by automatic responses to user interactions, by importation of data from external sources, by any other suitable technique, or any combination thereof. For example, if a commonly searched for term is not represented in the knowledge graph, one or more nodes representing that node may be added. In another example, a user may manually add information and organizational structures.

A node representing organizational data may be included in a knowledge graph. These may be referred to herein as entity type nodes. As used herein, an entity type node may refer to a node in a knowledge graph, while an entity type may refer to the concept represented by an entity type node. An entity type may be a defining characteristic of an entity. For example, entity type node Y may be connected to an entity node X by an [Is A] edge or link, discussed further below, such that the graph represents the information "The Entity X Is Type Y." For example, the entity node [George Washington] may be connected to the entity type node [President]. An entity node may be connected to multiple entity type nodes, for example, [George Washington] may also be connected to entity type node [Person] and to entity type node [Military Commander]. In another example, the entity type node [City] may be connected to entity nodes [New York City] and [San Francisco]. In another example, the concept [Tall People], although incompletely defined, i.e., it does not necessarily include a definition of the property [tall], may exist as an entity type node. In some implementations, the presence of the entity type node [Tall People], and other entity type nodes, may be based on user interaction.

In some implementations, an entity type node may include or be connected to data about: a list of properties associated with that entity type node, the domain to which that entity type node belongs, descriptions, values, any other suitable information, or any combination thereof. A domain refers to a collection of related entity types. For example, the domain [Film] may include, for example, the entity types [Actor], [Director], [Filming Location], [Movie], any other suitable entity type, or any combination thereof. In some implementations, entities are associated with types in more than one domain. For example, the entity node [Benjamin Franklin] may be connected with the entity type node [Politician] in the domain [Government] as well as the entity type node [Inventor] in the domain [Business].

In some implementations, properties associated with entity nodes or entity type nodes may also be represented as nodes. For example, nodes representing the property [Population] or [Location] may be connected to the entity type node [City]. The combination and/or arrangement of an entity type and its properties is referred to as a schema. In some implementations, schemas are stored in tables or other suitable data structures associated with an entity type node. In some implementations, the knowledge graph may be self-defining or bootstrapping, such that it includes particular nodes and edges that define the concept of nodes, edges, and the graph itself. For example, the knowledge graph may contain an entity node [Knowledge Graph] that is connected to property nodes that describe a knowledge graph's properties such as [Has Nodes] and [Has Edges].

Specific values, in some implementations referred to as literals, may be associated with a particular entity in a terminal node by an edge defining the relationship. Literals may refer to values and/or strings of information. For example, literals may include dates, names, and/or numbers. In an example, the entity node [San Francisco] may be connected to a terminal node containing the literal [815000] by an edge annotated with the property [Has Population]. In some implementations, terminal nodes may contain a reference or link to long text strings and other information stored in one or more documents external to the knowledge graph. In some implementations, literals are stored as nodes in the knowledge graph. In some implementations, literals are stored in the knowledge graph but are not assigned a unique identification reference as described below, and are not capable of being associated with multiple entities. In some implementations, literal type nodes may define a type of literal, for example [Date/Time], [Number], or [GPS Coordinates].

In some implementations, the grouping of an edge and two nodes is referred to as a triple. The triple represents the relationship between the nodes, or in some implementations, between the node and itself. In some implementations, higher order relationships are modeled, such as quaternary and n-ary relationships, where n is an integer greater than 2. In some implementations, information modeling the relationship is stored in a node, which may be referred to as a mediator node. In an example, the information "Person X Donates Artifact Y To Museum Z" is stored in a mediator node connected entity nodes to X, Y, and Z, where each edge identifies the role of each respective connected entity node.

In some implementations, the knowledge graph may include information for differentiation and disambiguation of terms and/or entities. As used herein, differentiation refers to the many-to-one situation where multiple names are associated with a single entity. As used herein, disambiguation refers to the one-to-many situation where the same name is associated with multiple entities. In some implementations, nodes may be assigned a unique identification reference. In some implementations, the unique identification reference may be an alphanumeric string, a name, a number, a binary code, any other suitable identifier, or any combination thereof. The unique identification reference may allow the system to assign unique references to nodes with the same or similar textual identifiers. In some implementations, the unique identifiers and other techniques are used in differentiation, disambiguation, or both.

In some implementations of differentiation, a node may be associated with multiple terms or differentiation aliases in which the terms are associated with the same entity. For example, the terms [George Washington], [Geo. Washington], [President Washington], and [President George Washington] may all be associated with a single entity, i.e., node, in the knowledge graph. This may provide differentiation and simplification in the knowledge graph.

In some implementations of disambiguation, multiple nodes with the same or similar names are defined by their unique identification references, by associated nodes in the knowledge graph, by any other suitable information, or any combination thereof. For example, there may be an entity node related to the city [Philadelphia], an entity node related to the movie [Philadelphia], and an entity node related to the cream cheese brand [Philadelphia]. Each of these nodes may have a unique identification reference, stored for example as a number, for disambiguation within the knowledge graph. In some implementations, disambiguation in the knowledge graph is provided by the connections and relationships between multiple nodes. For example, the city [New York] may be disambiguated from the state [New York] because the city is connected to an entity type [City] and the state is connected to an entity type [State]. It will be understood that more complex relationships may also define and disambiguate nodes. For example, a node may be defined by associated types, by other entities connected to it by particular properties, by its name, by any other suitable information, or any combination thereof. These connections may be useful in disambiguating, for example, the node [Georgia] that is connected to the node [United States] may be understood represent the U.S. State, while the node [Georgia] connected to the nodes [Asia] and [Eastern Europe] may be understood to represent the country in eastern Europe.

In some implementations, a node may include or connect to data defining one or more attributes. The attributes may define a particular characteristic of the node. The particular attributes of a node may depend on what the node represents. In some implementations, an entity node may include or connect to: a unique identification reference, a list of entity types associated with the node, a list of differentiation aliases for the node, data associated with the entity, a textual description of the entity, links to a textual description of the entity, other suitable information, or any combination thereof. As described above, nodes may contain a reference or link to long text strings and other information stored in one or more documents external to the knowledge graph. In some implementations, the storage technique may depend on the particular information. For example, a unique identification reference may be stored within the node, a short information string may be stored in a terminal node as a literal, and a long description of an entity may be stored in an external document linked to by a reference in the knowledge graph.

An edge in a knowledge graph may represent a semantic connection defining a relationship between two nodes. The edge may represent a prepositional statement such as [Is A], [Has A], [Is Of A Type], [Has Property], [Has Value], any other suitable statement, or any combination thereof. For example, the entity node of a particular person may be connected by a [Date Of Birth] edge to a terminal node containing a literal of his or her specific date of birth. In some implementations, the properties defined by edge connections of an entity may relate to nodes connected to the type of that entity. For example, the entity type node [Movie] may be connected to entity nodes [Actor] and [Director], and a particular movie may be connected by an edge property [Has Actor] to an entity node representing a particular actor.

In some implementations, nodes and edges define the relationship between an entity type node and its properties, thus defining a schema. For example, an edge may connect an entity type node to a node associated with a property, which may be referred to as a property node. Entities of the type may be connected to nodes defining particular values of those properties. For example, the entity type node [Person] may be connected to property node [Date of Birth] and a node [Height]. Further, the node [Date of Birth] may be connected to the literal type node [Date/Time], indicating that literals associated with [Date of Birth] include date/time information. The entity node [George Washington], which is connected to entity type node [Person] by an [Is A] edge, may also be connected to a literal [Feb. 22, 1732] by the edge [Has Date Of Birth]. In some implementations, the entity node [George Washington] is connected to a [Date Of Birth] property node. It will be understood that in some implementations, both schema and data are modeled and stored in a knowledge graph using the same technique. In this way, both schema and data can be accessed by the same search techniques. In some implementations, schemas are stored in a separate table, graph, list, other data structure, or any combination thereof. It will also be understood that properties may be modeled by nodes, edges, literals, any other suitable data, or any combination thereof.

For example, the entity node [George Washington] may be connected by an [Is A] edge to the entity type node representing [Person], thus indicating an entity type of the entity, and may also be connected to a literal [Feb. 22, 1732] by the edge [Has Date Of Birth], thus defining a property of the entity. In this way, the knowledge graph defines both entity types and properties associated with a particular entity by connecting to other nodes. In some implementations, [Feb. 22, 1732] may be a node, such that it is connected to other events occurring on that date. In some implementations, the date may be further connected to a year node, a month node, and a day of node. It will be understood that this information may be stored in any suitable combination of literals, nodes, terminal nodes, interconnected entities, any other suitable arrangement, or any combination thereof.

Figure 5:
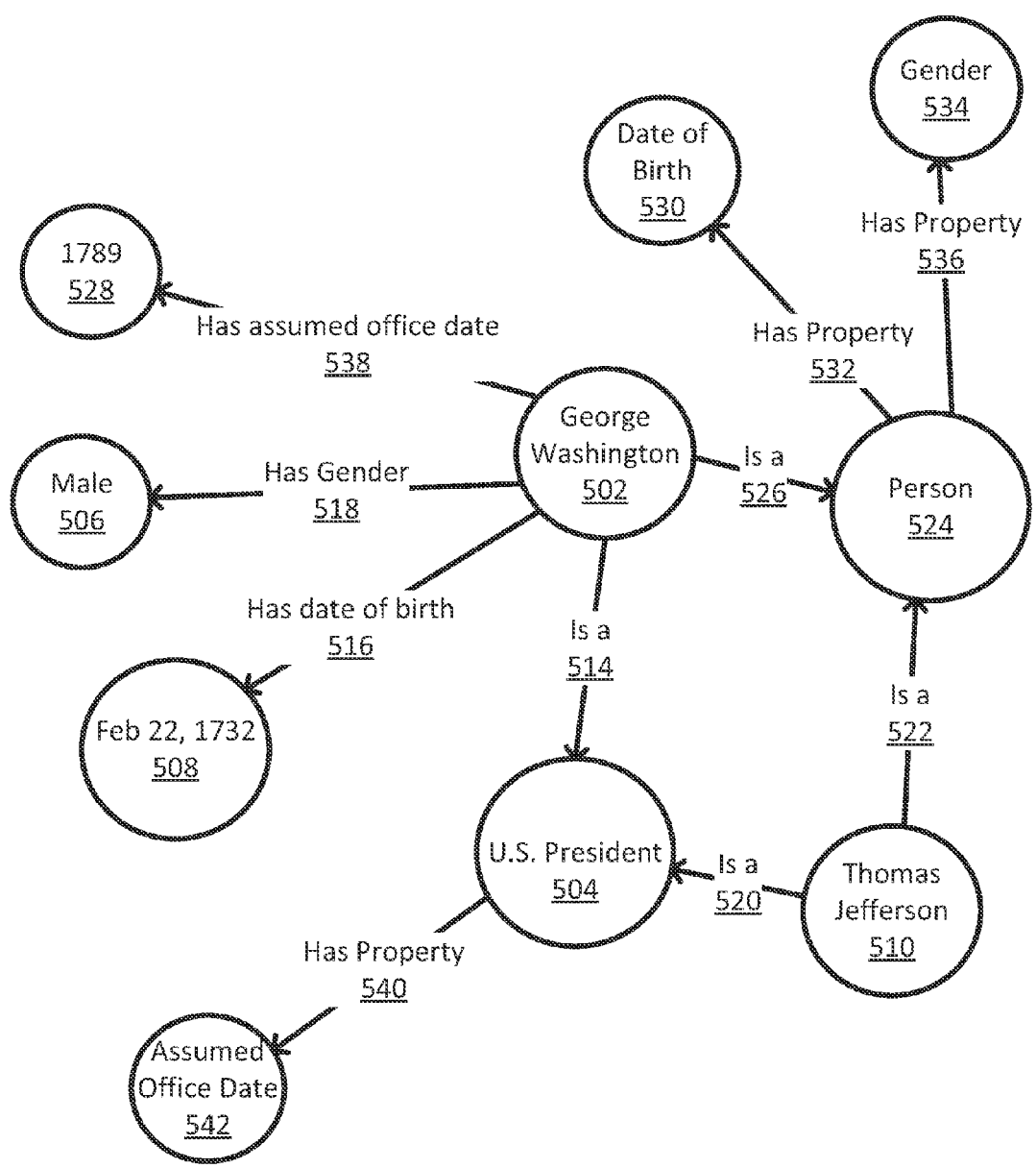
FIG. 5 shows an illustrative knowledge graph portion in accordance with some implementations of the present disclosure.

FIG. 5 shows illustrative knowledge graph portion 500 in accordance with some implementations of the present disclosure. Knowledge graph portion 500 includes information related to the entity [George Washington], represented by [George Washington] node 502. [George Washington] node 502 is connected to [U.S. President] entity type node 504 by [Is A] edge 514 with the semantic content [Is A], such that the 3-tuple defined by nodes 502 and 504 and the edge 514 contains the information "George Washington is a U.S. President." Similarly, "Thomas Jefferson Is A U.S. President" is represented by the tuple of [Thomas Jefferson] node 510, [Is A] edge 520, and [U.S. President] node 504. Knowledge graph portion 500 includes entity type nodes [Person] 524, and [U.S. President] node 504. The person type is defined in part by the connections from [Person] node 524. For example, the type [Person] is defined as having the property [Date Of Birth] by node 530 and edge 532, and is defined as having the property [Gender] by node 534 and edge 536. These relationships define in part a schema associated with the entity type [Person].

[George Washington] node 502 is shown in knowledge graph portion 500 to be of the entity types [Person] and [U.S. President], and thus is connected to nodes containing values associated with those types. For example, [George Washington] node 502 is connected by [Has Gender] edge 518 to [Male] node 506, thus indicating that "George Washington has gender Male." Further, [Male] node 506 may be connected to the [Gender] node 534 indicating that "Male Is A Type Of Gender." Similarly, [George Washington] node 502 is connected by [Has Date of Birth] edge 516 to [Feb. 22, 1732] node 508, thus indicating that "George Washington Has Date Of Birth Feb. 22, 1732." [George Washington] node 502 may also be connected to [1789] node 528 by [Has Assumed Office Date] edge 538.

Knowledge graph portion 500 also includes [Thomas Jefferson] node 510, connected by [Is A] edge 520 to entity type [U.S. President] node 504 and by [Is A] edge 522 to [Person] entity type node 524. Thus, knowledge graph portion 500 indicates that "Thomas Jefferson" has the entity types "U.S. President" and "Person." In some implementations, [Thomas Jefferson] node 510 is connected to nodes not shown in FIG. 5 referencing his date of birth, gender, and assumed office date.

It will be understood that knowledge graph portion 500 is merely an example and that it may include nodes and edges not shown. For example, [U.S. President] node 504 may be connected to all of the U.S. Presidents. [U.S. President] node 504 may also be connected to properties related to the entity type such as a duration of term, for example [4 Years], a term limit, for example [2 Terms], a location of office, for example [Washington D.C.], any other suitable data, or any combination thereof. For example, [U.S. President] node 504 is connected to [Assumed Office Date] node 542 by [Has Property] edge 540, defining in part a schema for the type [U.S. President]. Similarly, [Thomas Jefferson] node 510 may be connected to any suitable number of nodes containing further information related to his illustrated entity type nodes [U.S. President], and [Person], and to other entity type nodes not shown such as [Inventor], [Vice President], and [Author]. In a further example, [Person] node 524 may be connected to all entities in the knowledge graph with the type [Person]. In a further example, [1789] node 528 may be connected to all events in the knowledge graph with the property of year [1789]. [1789] node 528 is unique to the year 1789, and disambiguated from, for example, a book entitled [1789], not shown in FIG. 5, by its unique identification reference. In some implementations, [1789] node 528 is connected to the entity type node [Year].

Figure 6:
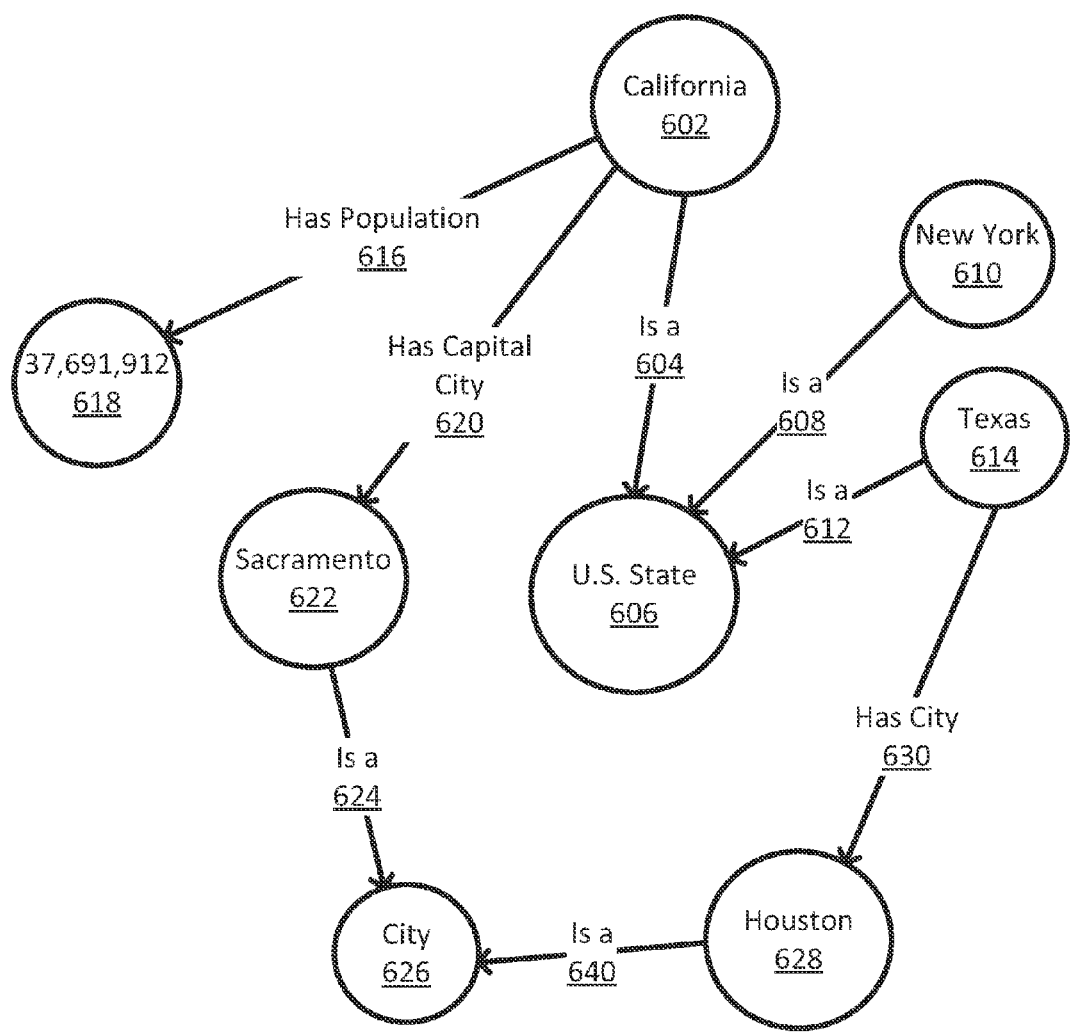
FIG. 6 shows another illustrative knowledge graph portion in accordance with some implementations of the present disclosure.

FIG. 6 shows illustrative knowledge graph portion 600 in accordance with some implementations of the present disclosure. Knowledge graph portion 600 includes [California] node 602, which may also be associated with differentiation aliases such as, for example, [CA], [Calif.], [Golden State], any other suitable differentiation aliases, or any combination thereof. In some implementations, these differentiations are stored in [California] node 602. California is connected by [Is A] edge 604 to the [U.S. State] entity type node 606. [New York] node 610 and [Texas] node 614 are also connected to [U.S. State] node 606 by [Is A] edges 608 and 612, respectively. [California] node 602 is connected by

[Has Capital City] edge 620 to [Sacramento] node 622, indicating the information that "California Has Capital City Sacramento." Sacramento node 622 is further connected by [Is A] edge 624 to the [City] entity type node 626. Similarly, [Texas] node 614 is connected by [Has City] edge 630 to [Houston] node 628, which is further connected to the [City] entity type node 626 by [Is A] edge 340. [California] node 602 is connected by [Has Population] edge 616 to node 618 containing the literal value [37,691,912]. In an example, the particular value [37,691,912] may be periodically automatically updated by the knowledge graph based on an external website or other source of data. Knowledge graph portion 600 may include other nodes not shown. For example, [U.S. State] entity type node 606 may be connected to nodes defining properties of that type such as [Population] and [Capital City]. These type-property relationships may be used to define other relationships in knowledge graph portion 600 such as [Has Population] edge 616 connecting entity node [California] 602 with terminal node 618 containing the literal defining the population of California.

It will be understood that while knowledge graph portion 500 of FIG. 5 and knowledge graph portion 600 of FIG. 6 below show portions of a knowledge graph, all pieces of information may be contained within a single graph and that these selections illustrated herein are merely an example. In some implementations, separate knowledge graphs are maintained for different respective domains, for different respective entity types, or according to any other suitable delimiting characteristic. In some implementations, separate knowledge graphs are maintained according to size constraints. In some implementations, a single knowledge graph is maintained for all entities and entity types.

A knowledge graph may be implemented using any suitable software constructs. In an example, a knowledge graph is implemented using object oriented constructs in which each node is an object with associated functions and variables. Edges, in this context, may be objects having associated functions and variables. In some implementations, data contained in a knowledge graph, pointed to by nodes of a knowledge graph, or both, is stored in any suitable one or more data repositories across one or more servers located in one or more geographic locations coupled by any suitable network architecture.

Figure 7:
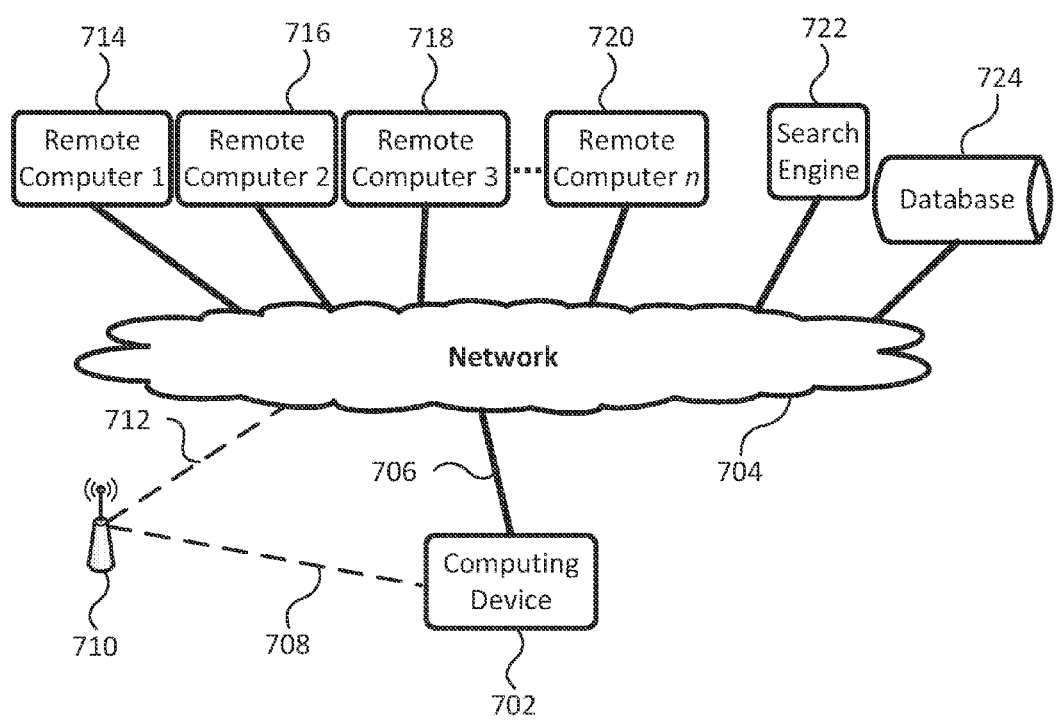
FIG. 7 shows an illustrative computer system in accordance with some implementations of the present disclosure.
Figure 8:
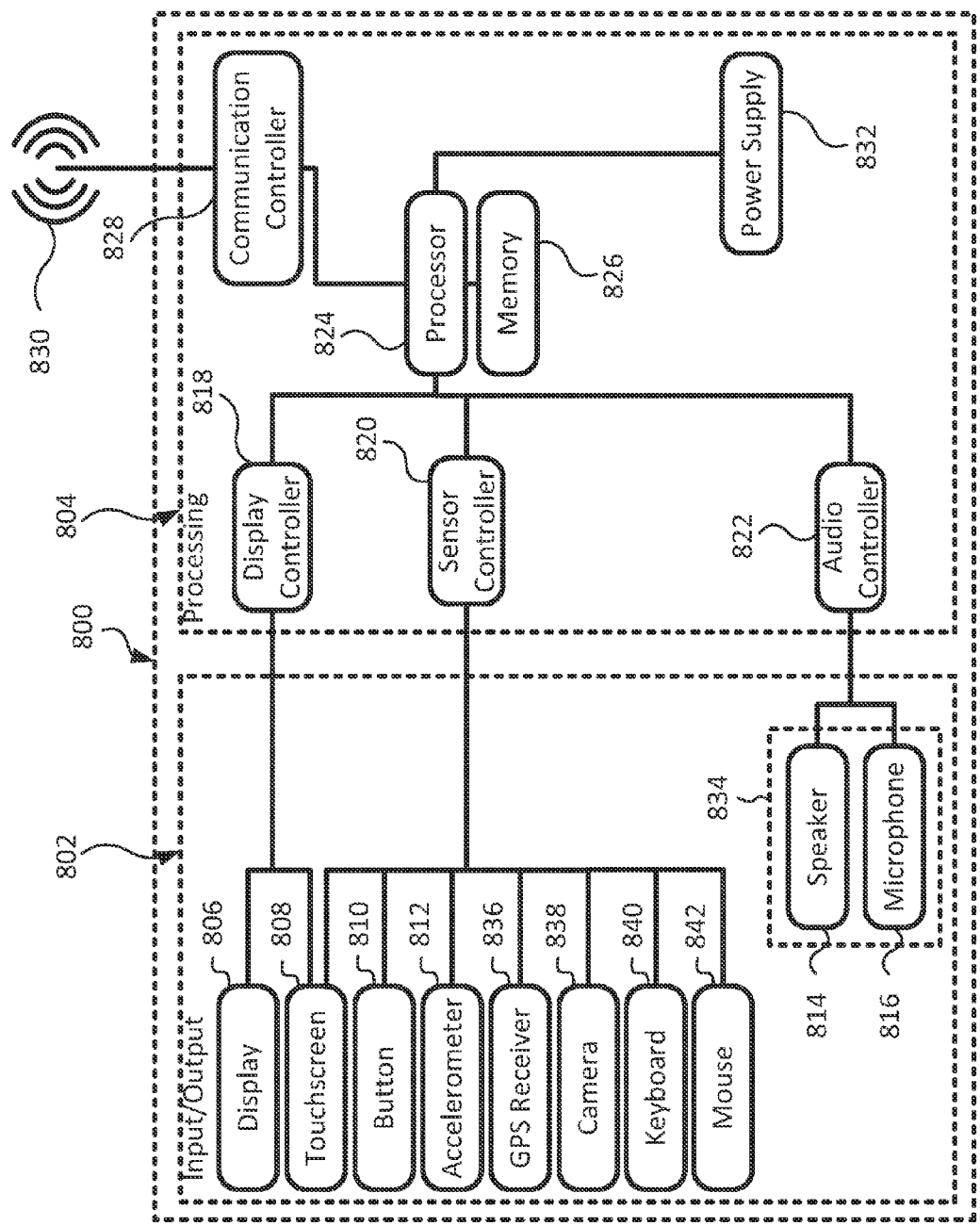
FIG. 8 is a block diagram of a computer in accordance with some implementations of the present disclosure.

The following description and accompanying FIGS. 7 and 8 describe illustrative computer systems that may be used in some implementations of the present disclosure. It will be understood that elements of FIGS. 7 and 8 are merely exemplary and that any suitable elements may be added, removed, duplicated, replaced, or otherwise modified.

It will be understood that the system may be implemented on any suitable computer or combination of computers. In some implementations, the system is implemented in a distributed computer system including two or more computers. In an example, the system may use a cluster of computers located in one or more locations to perform processing and storage associated with the system. It will be understood that distributed computing may include any suitable parallel computing, distributed computing, network hardware, network software, centralized control, decentralized control, any other suitable implementations, or any combination thereof.

FIG. 7 shows an illustrative computer system in accordance with some implementations of the present disclosure. System 700 may include one or more computing device 702. In some implementations, computing device 702, and any other device of system 700, includes one or more computers and/or one or more processors. In some implementations, a processor includes one or more hardware processors, for example, integrated circuits, one or more software modules, computer-readable media such as memory, firmware, or any combination thereof. In some implementations, computing device 702 includes one or more computer-readable medium storing software, include instructions for execution by the one or more processors for performing the techniques discussed above with respect to FIG. 3, or any other techniques disclosed herein. In some implementations, computing device 702 includes a smartphone, tablet computer, desktop computer, laptop computer, server, personal digital assistant (PDA), portable audio player, portable video player, mobile gaming device, other suitable user device capable of providing content, or any combination thereof.

Computing device 702 may be coupled to network 704 directly through connection 706, through wireless repeater 710, by any other suitable way of coupling to network 704, or by any combination thereof. Network 704 may include the Internet, a dispersed network of computers and servers, a local network, a public intranet, a private intranet, other coupled computing systems, or any combination thereof.

Computing device 702 may be coupled to network 704 by wired connection 706. Connection 706 may include Ethernet hardware, coaxial cable hardware, DSL hardware, T-1 hardware, fiber optic hardware, analog phone line hardware, any other suitable wired hardware capable of communicating, or any combination thereof. Connection 706 may include transmission techniques including TCP/IP transmission techniques, IEEE 802 transmission techniques, Ethernet transmission techniques, DSL transmission techniques, fiber optic transmission techniques, ITU-T transmission techniques, any other suitable transmission techniques, or any combination thereof.

Computing device 702 may be wirelessly coupled to network 704 by wireless connection 708. In some implementations, wireless repeater 710 receives transmitted information from computing device 702 by wireless connection 708 and communicates it with network 704 by connection 712. Wireless repeater 710 receives information from network 704 by connection 712 and communicates it with computing device 702 by wireless connection 708. In some implementations, wireless connection 708 may include cellular phone transmission techniques, code division multiple access (CDMA) transmission techniques, global system for mobile communications (GSM) transmission techniques, general packet radio service (GPRS) transmission techniques, satellite transmission techniques, infrared transmission techniques, Bluetooth transmission techniques, Wi-Fi transmission techniques, WiMax transmission techniques, any other suitable transmission techniques, or any combination thereof.

Connection 712 may include Ethernet hardware, coaxial cable hardware, DSL hardware, T-1 hardware, fiber optic hardware, analog phone line hardware, wireless hardware, any other suitable hardware capable of communicating, or any combination thereof. Connection 712 may include wired transmission techniques including TCP/IP transmission techniques, IEEE 802 transmission techniques, Ethernet transmission techniques, DSL transmission techniques, fiber optic transmission techniques, ITU-T transmission techniques, any other suitable transmission techniques, or any combination thereof. Connection 712 may include may include wireless transmission techniques including cellular phone transmission techniques, code division multiple access (CDMA) transmission techniques, global system for mobile communications (GSM) transmission techniques, general packet radio service (GPRS) transmission techniques, satellite transmission techniques, infrared transmission techniques, Bluetooth transmission techniques, Wi-Fi transmission techniques, WiMax transmission techniques, any other suitable transmission techniques, or any combination thereof.

Wireless repeater 710 may include any number of cellular phone transceivers, network routers, network switches, communication satellites, other devices for communicating information from computing device 702 to network 704, or any combination thereof. It will be understood that the arrangement of connection 706, wireless connection 708 and connection 712 is merely illustrative and that system 700 may include any suitable number of any suitable devices coupling computing device 702 to network 704. It will also be understood that any computing device 702, may be communicatively coupled with any user device, remote server, local server, any other suitable processing equipment, or any combination thereof, and may be coupled using any suitable technique as described above.

In some implementations, any suitable number of remote servers 714, 716, 718, 720, may be coupled to network 704. Remote servers may be general purpose, specific, or any combination thereof. One or more search engine servers 722 may be coupled to the network 704. In some implementations, search engine server 722 may include the knowledge graph, may include processing equipment configured to access the knowledge graph, may include processing equipment configured to receive search queries related to the knowledge graph, may include any other suitable information or equipment, or any combination thereof. One or more database servers 724 may be coupled to network 704. In some implementations, database server 724 may store the knowledge graph. In some implementations, where there is more than one knowledge graph, the more than one may be included in database server 724, may be distributed across any suitable number of database servers and general purpose servers by any suitable technique, or any combination thereof. It will also be understood that the system may use any suitable number of general purpose, specific purpose, storage, processing, search, any other suitable server, or any combination.

FIG. 8 is a block diagram of a computing device of system 700 of FIG. 7 in accordance with some implementations of the present disclosure. FIG. 8 includes computing device 800. In some implementations, computing device 800 corresponds to computing device 702 of FIG. 7, a remote computer illustrated in system 700 of FIG. 7, any other suitable computer corresponding to system 700 of FIG. 7, any other suitable device, or any combination thereof. In some implementations, computing device 800 is an illustrative local and/or remote computer that is part of a distributed computing system. Computing device 800 may include input/output equipment 802 and processing equipment 804. Input/output equipment 802 may include display 806, touchscreen 808, button 810, accelerometer 812, global positions system (GPS) receiver 836, camera 838, keyboard 840, mouse 842, and audio equipment 834 including speaker 814 and microphone 816. In some implementations, the equipment of computing device 800 may be representative of equipment included in a smartphone user device. It will be understood that the specific equipment included in the illustrative computer system may depend on the type of user device. For example, the input/output equipment 802 of a desktop computer may include a keyboard 840 and mouse 842 and may omit accelerometer 812 and GPS receiver 836. It will be understood that computing device 800 may omit any suitable illustrated elements, and may include equipment not shown such as media drives, data storage, communication devices, display devices, processing equipment, any other suitable equipment, or any combination thereof.

In some implementations, display 806 may include a liquid crystal display, light emitting diode display, organic light emitting diode display, amorphous organic light emitting diode display, plasma display, cathode ray tube display, projector display, any other suitable type of display capable of displaying content, or any combination thereof. Display 806 may be controlled by display controller 818 or by processor 824 in processing equipment 804, by processing equipment internal to display 806, by other controlling equipment, or by any combination thereof. In some implementations, display 806 may display data from a knowledge graph.

Touchscreen 808 may include a sensor capable of sensing pressure input, capacitance input, resistance input, piezoelectric input, optical input, acoustic input, any other suitable input, or any combination thereof. Touchscreen 808 may be capable of receiving touch-based gestures. Received gestures may include information relating to one or more locations on the surface of touchscreen 808, pressure of the gesture, speed of the gesture, duration of the gesture, direction of paths traced on its surface by the gesture, motion of the device in relation to the gesture, other suitable information regarding a gesture, or any combination thereof. In some implementations, touchscreen 808 may be optically transparent and located above or below display 806. Touchscreen 808 may be coupled to and controlled by display controller 818, sensor controller 820, processor 824, any other suitable controller, or any combination thereof. In some implementations, touchscreen 808 may include a virtual keyboard capable of receiving, for example, a search query used to identify data in a knowledge graph.

In some implementations, a gesture received by touchscreen 808 may cause a corresponding display element to be displayed substantially concurrently (i.e., immediately following or with a short delay) by display 806. For example, when the gesture is a movement of a finger or stylus along the surface of touchscreen 808, the search system may cause a visible line of any suitable thickness, color, or pattern indicating the path of the gesture to be displayed on display 806. In some implementations, for example, a desktop computer using a mouse, the functions of the touchscreen may be fully or partially replaced using a mouse pointer displayed on the display screen.

Button 810 may be one or more electromechanical push-button mechanism, slide mechanism, switch mechanism, rocker mechanism, toggle mechanism, other suitable mechanism, or any combination thereof. Button 810 may be included in touchscreen 808 as a predefined region of the touchscreen (e.g., soft keys). Button 810 may be included in touchscreen 808 as a region of the touchscreen defined by the search system and indicated by display 806. Activation of button 810 may send a signal to sensor controller 820, processor 824, display controller 820, any other suitable processing equipment, or any combination thereof. Activation of button 810 may include receiving from the user a pushing gesture, sliding gesture, touching gesture, pressing gesture, time-based gesture (e.g., based on the duration of a push), any other suitable gesture, or any combination thereof.

Accelerometer 812 may be capable of receiving information about the motion characteristics, acceleration characteristics, orientation characteristics, inclination characteristics and other suitable characteristics, or any combination thereof, of computing device 800. Accelerometer 812 may be a mechanical device, microelectromechanical (MEMS) device, nanoelectromechanical (NEMS) device, solid state device, any other suitable sensing device, or any combination thereof. In some implementations, accelerometer 812 may be a 3-axis piezoelectric microelectromechanical integrated circuit which is configured to sense acceleration, orientation, or other suitable characteristics by sensing a change in the capacitance of an internal structure. Accelerometer 812 may be coupled to touchscreen 808 such that information received by accelerometer 812 with respect to a gesture is used at least in part by processing equipment 804 to interpret the gesture.

Global positioning system (GPS) receiver 836 may be capable of receiving signals from global positioning satellites. In some implementations, GPS receiver 836 may receive information from one or more satellites orbiting the earth, the information including time, orbit, and other information related to the satellite. This information may be used to calculate the location of computing device 800 on the surface of the earth. GPS receiver 836 may include a barometer (not shown) to improve the accuracy of the location. GPS receiver 836 may receive information from other wired and wireless communication sources regarding the location of computing device 800. For example, the identity and location of nearby cellular phone towers may be used in place of, or in addition to, GPS data to determine the location of computing device 800.

Camera 838 may include one or more sensors to detect light. In some implementations, camera 838 may receive video images, still images, or both. Camera 838 may include a charged coupled device (CCD) sensor, a complementary metal oxide semiconductor (CMOS) sensor, a photocell sensor, an IR sensor, any other suitable sensor, or any combination thereof. In some implementations, camera 838 may include a device capable of generating light to illuminate a subject, for example, an LED light. Camera 838 may communicate information captured by the one or more sensor to sensor controller 820, to processor 824, to any other suitable equipment, or any combination thereof. Camera 838 may include lenses, filters, and other suitable optical equipment. It will be understood that computing device 800 may include any suitable number of camera 838.

Audio equipment 834 may include sensors and processing equipment for receiving and transmitting information using acoustic or pressure waves. Speaker 814 may include equipment to produce acoustic waves in response to a signal. In some implementations, speaker 814 may include an electroacoustic transducer wherein an electromagnet is coupled to a diaphragm to produce acoustic waves in response to an electrical signal. Microphone 816 may include electroacoustic equipment to convert acoustic signals into electrical signals. In some implementations, a condenser-type microphone may use a diaphragm as a portion of a capacitor such that acoustic waves induce a capacitance change in the device, which may be used as an input signal by computing device 800.

Speaker 814 and microphone 816 may be contained within computing device 800, may be remote devices coupled to computing device 800 by any suitable wired or wireless connection, or any combination thereof.

Speaker 814 and microphone 816 of audio equipment 834 may be coupled to audio controller 822 in processing equipment 804. This controller may send and receive signals from audio equipment 834 and perform pre-processing and filtering steps before transmitting signals related to the input signals to processor 824. Speaker 814 and microphone 816 may be coupled directly to processor 824. Connections from audio equipment 834 to processing equipment 804 may be wired, wireless, other suitable arrangements for communicating information, or any combination thereof.

Processing equipment 804 of computing device 800 may include display controller 818, sensor controller 820, audio controller 822, processor 824, memory 826, communication controller 828, and power supply 832.

Processor 824 may include circuitry to interpret signals input to computing device 800 from, for example, touchscreen 808 and microphone 816. Processor 824 may include circuitry to control the output to display 806 and speaker 814. Processor 824 may include circuitry to carry out instructions of a computer program. In some implementations, processor 824 may be an integrated electronic circuit based, capable of carrying out the instructions of a computer program and include a plurality of inputs and outputs.

Processor 824 may be coupled to memory 826. Memory 826 may include random access memory (RAM), flash memory, programmable read only memory (PROM), erasable programmable read only memory (EPROM), magnetic hard disk drives, magnetic tape cassettes, magnetic floppy disks optical CD-ROM discs, CD-R discs, CD-RW discs, DVD discs, DVD+R discs, DVD-R discs, any other suitable storage medium, or any combination thereof.

The functions of display controller 818, sensor controller 820, and audio controller 822, as have been described above, may be fully or partially implemented as discrete components in computing device 800, fully or partially integrated into processor 824, combined in part or in full into combined control units, or any combination thereof.

Communication controller 828 may be coupled to processor 824 of computing device 800. In some implementations, communication controller 828 may communicate radio frequency signals using antenna 830. In some implementations, communication controller 828 may communicate signals using a wired connection (not shown). Wired and wireless communications communicated by communication controller 828 may use Ethernet, amplitude modulation, frequency modulation, bitstream, code division multiple access (CDMA), global system for mobile communications (GSM), general packet radio service (GPRS), satellite, infrared, Bluetooth, Wi-Fi, WiMax, any other suitable communication configuration, or any combination thereof. The functions of communication controller 828 may be fully or partially implemented as a discrete component in computing device 800, may be fully or partially included in processor 824, or any combination thereof. In some implementations, communication controller 828 may communicate with a network such as network 704 of FIG. 7 and may receive information from a knowledge graph stored, for example, in database 724 of FIG. 7.

Power supply 832 may be coupled to processor 824 and to other components of computing device 800. Power supply 832 may include a lithium-polymer battery, lithium-ion battery, NiMH battery, alkaline battery, lead-acid battery, fuel cell, solar panel, thermoelectric generator, any other suitable power source, or any combination thereof. Power supply 832 may include a hard wired connection to an electrical power source, and may include electrical equipment to convert the voltage, frequency, and phase of the electrical power source input to suitable power for computing device 800. In some implementations of power supply 832, a wall outlet may provide 720 volts, 60 Hz alternating current (AC). A circuit of transformers, resistors, inductors, capacitors, transistors, and other suitable electronic components included in power supply 832 may convert the 720V AC from a wall outlet power to 5 volts at 0 Hz (i.e., direct current). In some implementations of power supply 832, a lithium-ion battery including a lithium metal oxide-based cathode and graphite-based anode may supply 3.7V to the components of computing device 800. Power supply 832 may be fully or partially integrated into computing device 800, or may function as a stand-alone device. Power supply 832 may power computing device 800 directly, may power computing device 800 by charging a battery, may provide power by any other suitable way, or any combination thereof.

The foregoing is merely illustrative of the principles of this disclosure and various modifications may be made by those skilled in the art without departing from the scope of this disclosure. The above described implementations are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed:

1. A computer-implemented method comprising the following operations performed by at least one processor:
   receiving a query, wherein the query is associated at least in part with a type of entity;
   generating search results based at least in part on the query;
   ranking the search results based on relevance to the query;
   retrieving previously generated data associated with at least one search result of the search results, the previously generated data comprising one or more entity references in the at least one search result corresponding to the type of entity;
   determining, based on the relevance to the query, a subset of the ranked search results that are above a first predetermined ranking threshold;
   determining, for each entity reference, a weighted sum of the frequencies of occurrence of the entity reference in each search result in the subset of ranked search results, wherein the weighted sum normalizes the frequency of occurrence of each respective entity reference for each previously generated data;
   ranking the one or more entity references based on the respective weighted sums;
   selecting an entity result from the one or more entity references based at least in part on
   the ranking of the one or more entity references; and
   providing an answer to the query based at least in part on the entity result.

2. The method of claim 1, wherein the query is a natural language query.

3. The method of claim 1, wherein the type of the entity is a person type.

4. The method of claim 1, further comprising:
   determining that the ranking of the one or more entity references results in a tie,
   determining, for each ranked search result below the first predetermined ranking threshold and above a second predetermined threshold, a ranking signal for each entity reference; and
   reranking the one or more entity references based on a weighted sum of the determined ranking signals associated with each ranked search result below the first predetermined ranking threshold and above the second predetermined threshold;
   wherein selecting an entity result is based at least in part on the rerank of the one or more entity references.

5. The method of claim 1, wherein the weighted sum normalizes the frequency of occurrence of each respective entity reference for each previously generated data based on a length of the respective previously generated data.

6. The method of claim 1, further comprising a topicality score of each respective entity reference based on the number of links to and from the respective previously generated data.

7. The method of claim 1, wherein the previously generated data comprises unstructured data.

8. A system comprising:
   one or more computers configured to perform operations comprising:
      receiving a query, wherein the query is associated at least in part with a type of entity;
      generating search results based at least in part on the query;
      ranking the search results based on relevance to the query;
      retrieving previously generated data associated with at least one search result of the search results, the previously generated data comprising one or more entity references in the at least one search result corresponding to the type of entity;
      determining, based on the relevance to the query, a subset of the ranked search results that are above a first predetermined ranking threshold;
      determining, for each entity reference, a weighted sum of the frequencies of occurrence of the entity reference in each search result in the subset of ranked search results, wherein the weighted sum normalizes the frequency of occurrence of each respective entity reference for each previously generated data;
      ranking the one or more entity references based on the respective weighted sums;
      selecting an entity result from the one or more entity references based at least in part on
      the ranking of the one or more entity references; and
      providing an answer to the query based at least in part on the entity result.

9. The system of claim 8, wherein the query is a natural language query.

10. The system of claim 8, wherein the type of tile entity is a person type.

11. The system of claim 8, wherein the operations performed by the one or more computers further comprise:
    determining that the ranking of the one or more entity references results in a tie;
    determining, for each ranked search result below the first predetermined ranking threshold and above a second predetermined threshold, a ranking signal for each entity reference; and
    reranking the one or more entity references based on a new weighted sum of the determined ranking signals associated with each ranked search result below the first predetermined ranking threshold and above the second predetermined threshold;
    wherein selecting an entity result is based at least in part on the rerank of the one or more entity references.

12. The system of claim 8, wherein the weighted sum normalizes the frequency of occurrence of each respective entity reference for each previously generated data based on a length of the respective previously generated data.

13. The system of claim 8, wherein the operations performed by the one or more computers further comprise determining a topicality score of each respective entity reference based on the number of links to and from the respective previously generated data.

14. The system of claim 8, wherein the previously generated data comprises unstructured data.

15. A non-transitory computer-readable medium storing instructions that, when executed by one or more processors, cause the one or more processors to perform operations comprising:
   receiving a query, wherein the query is associated at least in part with a type of entity; generating search results based at least in part on the query;
   ranking the search results based on relevance to the query;
   retrieving previously generated data associated with at least one search result of the search results, the previously generated data comprising one or more entity references in the at least one search result corresponding to the type of entity;
   determining, based on the relevance to the query, a subset of the ranked search results that are above a first predetermined ranking threshold;
   determining, for each entity reference, a weighted sum of the frequencies of occurrence of the entity reference in each search result in the subset of ranked search results, wherein the weighted sum normalizes the frequency of occurrence of each respective entity reference for each previously generated data;
   ranking the one or more entity references based on the respective weighted sums;
   selecting an entity result from the one or more entity references based at least in part on
   the ranking of the one or more entity references; and
   providing an answer to the query based at least in part on the entity result.

16. The computer-readable medium of claim 15, wherein the query is a natural language query.

17. The computer-readable medium of claim 15, wherein the type of the entity is a person type.

18. The computer-readable medium of claim 15, wherein the operations performed by the one or more processors further comprise:
   determining that the ranking of the one or more entity references results in a tie;
   determining, for each ranked search result below the first predetermined ranking threshold and above a second predetermined threshold, a ranking signal for each entity reference; and
   reranking the one or more entity references based on a new weighted sum of the determined ranking signals associated with each ranked search result below the first predetermined ranking threshold and above the second predetermined threshold;
   wherein selecting an entity result is based at least in part on the rerank of the one or more entity references.

19. The computer-readable medium of claim 15, wherein the weighted sum normalizes the frequency of occurrence of each respective entity reference for each previously generated data based on a length of the respective previously generated data.

20. The computer-readable medium of claim 15, wherein the operations performed by the one or more processors further comprise determining a topicality score of each respective entity reference based on the number of links to and from the respective previously generated data.

21. The computer-readable medium of claim 15, wherein the previously generated data comprises unstructured data.

* * * * *